US012324498B2

(12) United States Patent

Chikazawa et al.

(10) Patent No.: US 12,324,498 B2
(45) Date of Patent: *Jun. 10, 2025

(54) HAIRCARE DEVICE

(71) Applicant: Panasonic Intellectual Property Management Co., Ltd., Osaka (JP)

(72) Inventors: Yuki Chikazawa, Nara (JP); Hirotoshi Oikaze, Shiga (JP); Masato Kinoshita, Shiga (JP); Hiroyuki Inoue, Shiga (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 478 days.

This patent is subject to a terminal disclaimer.

(21) Appl. No.: 17/784,938

(22) PCT Filed: Jan. 29, 2021

(86) PCT No.: PCT/JP2021/003194

§ 371 (c)(1),
(2) Date: Jun. 13, 2022

(87) PCT Pub. No.: WO2021/166594

PCT Pub. Date: Aug. 26, 2021

(65) Prior Publication Data

US 2023/0014684 A1 Jan. 19, 2023

(30) Foreign Application Priority Data

Feb. 21, 2020 (JP) ................................ 2020-028772

(51) Int. Cl.
*A45D 20/12* (2006.01)
*A45D 34/04* (2006.01)
(Continued)

(52) U.S. Cl.
CPC ............ *A45D 20/12* (2013.01); *A45D 34/04* (2013.01); *B05B 7/2427* (2013.01);
(Continued)

(58) Field of Classification Search
CPC ...... A45D 20/12; A45D 34/04; B05B 7/2427; B05B 9/0416; B05B 9/0822; B05B 12/08
(Continued)

(56) References Cited

U.S. PATENT DOCUMENTS 4,778,631 A * 10/1988 Cobbs, Jr. ............... B29B 7/481 261/92
5,992,686 A * 11/1999 Cline ........................ B29B 7/94 222/63
(Continued)

FOREIGN PATENT DOCUMENTS

JP H01-288208 A 11/1989
JP 5-309013 A 11/1993
(Continued)

OTHER PUBLICATIONS

The EPC Office Action dated May 14, 2024 for the related European Patent Application No. 21757629.7.
(Continued)

*Primary Examiner* — Qingzhang Zhou
*Assistant Examiner* — Kevin Edward Schwartz
(74) *Attorney, Agent, or Firm* — Rimon P.C.

(57) ABSTRACT

A hair care device according to the present disclosure includes a tank that stores a liquid, a liquid feed pump that outputs the liquid stored in the tank, and a controller that controls an output of the liquid feed pump. The hair care device according to the present disclosure further includes a detector that detects torque of the liquid feed pump. The controller adjusts the output of the liquid feed pump based on a detection value of the detector. Thus, the hair care
(Continued)

device that suitably sprays a cosmetic component is provided.

5 Claims, 3 Drawing Sheets

(51) Int. Cl.

| | |
|---|---|
| ***B05B 7/24*** | (2006.01) |
| ***B05B 9/04*** | (2006.01) |
| ***B05B 9/08*** | (2006.01) |
| ***B05B 12/08*** | (2006.01) |

(52) U.S. Cl.
CPC .......... *B05B 9/0416* (2013.01); *B05B 9/0822* (2013.01); *B05B 12/08* (2013.01)

(58) Field of Classification Search
USPC ............................................. 239/310; 222/63
See application file for complete search history.

(56) References Cited

U.S. PATENT DOCUMENTS

| | | | | |
|---|---|---|---|---|
| 2010/0211205 | A1* | 8/2010 | Baumann | H02P 29/10 700/109 |
| 2011/0162528 | A1 | 7/2011 | Yamaguchi et al. | |
| 2014/0208605 | A1* | 7/2014 | Yoshidome | A45D 20/10 34/97 |
| 2018/0339303 | A1 | 11/2018 | Inoue et al. | |
| 2023/0009980 | A1* | 1/2023 | Oikaze | B05B 9/0861 |

FOREIGN PATENT DOCUMENTS

| | | | |
|---|---|---|---|
| JP | 2012-086173 | A | 5/2012 |
| JP | 2018-196862 | A | 12/2018 |
| WO | 2010/035707 | A1 | 4/2010 |

OTHER PUBLICATIONS

International Search Report issued on Apr. 20, 2021 in International Application No. PCT/JP2021/003194, with English translation.

* cited by examiner

HAIRCARE DEVICE

CROSS-REFERENCE OF RELATED APPLICATIONS

This application is the U.S. National Phase under 35 U.S.C. § 371 of International Patent Application No. PCT/JP2021/003194, filed on Jan. 29, 2021, which in turn claims the benefit of Japanese Patent Application No. 2020-028772, filed on Feb. 21, 2020, the entire disclosures of which Applications are incorporated by reference herein.

TECHNICAL FIELD

The present disclosure relates to a hair care device.

BACKGROUND ART

A hair care device is required to appropriately spray a cosmetic component. A hair care device described in PTL 1 detects an inclination in a vertical direction of the hair care device and controls a pump that sends out a cosmetic component based on the inclination to appropriately spray the cosmetic component.

CITATION LIST

Patent Literature

PTL 1: Unexamined Japanese Patent Publication No. 2018-196862

SUMMARY OF THE INVENTION

Cosmetic components used in hair care devices have various properties. The hair care device described in PTL 1 does not perform control according to the properties of the cosmetic component, and there is a possibility that the cosmetic component is not suitably output to a user.

The present disclosure addresses the foregoing problem, and an object thereof is to provide a hair care device that suitably sprays a cosmetic component.

A hair care device according to the present disclosure is a hair care device including a tank that stores a fluid, a liquid feed pump that outputs the liquid stored in the tank, and a controller that controls an output of the liquid feed pump, the hair care device further including a detector that detects torque of the liquid feed pump, in which the controller adjusts the output of the liquid feed pump based on a detection value of the detector.

According to the hair care device of the present disclosure, the cosmetic component can be suitably sprayed.

DESCRIPTION OF EMBODIMENTS (One Example of Modes that a Hair Care Device can Take)

A hair care device according to the present disclosure is a hair care device including a tank that stores a fluid, a liquid feed pump that outputs the liquid stored in the tank, and a controller that controls an output of the liquid feed pump, the hair care device further including a detector that detects torque of the liquid feed pump, in which the controller adjusts the output of the liquid feed pump based on a detection value of the detector.

According to the hair care device, because the output of the pump is controlled based on the detection value, the cosmetic component can be suitably sprayed.

According to an example of the hair care device, the detector detects a maximum value of the torque of the liquid feed pump, and the controller adjusts the output of the liquid feed pump based on the maximum value of the torque.

According to the hair care device, the output of the pump can be controlled using the maximum value of the torque of the liquid feed pump.

According to an example of the hair care device, the controller identifies a type of the liquid from the maximum value of the torque and adjusts the output of the liquid feed pump based on the type of the liquid.

According to the hair care device, because the control is executed based on the type of the liquid, the liquid can be appropriately output.

According to an example of the hair care device, the hair care device further includes an air blower pump that outputs gas, in which the controller adjusts an output of the air blower pump based on the detection value of the detector.

According to the hair care device, because the output of a motor of the air blower pump is controlled based on the detection value, the control can be suitably executed.

According to an example of the hair care device, the detector detects the maximum value of the torque, and the controller adjusts the output of the air blower pump based on the maximum value of the torque.

According to the hair care device, because the output of the air blower pump is controlled based on the maximum value of the torque, the control can be suitably executed.

First Exemplary Embodiment

Figure 2:
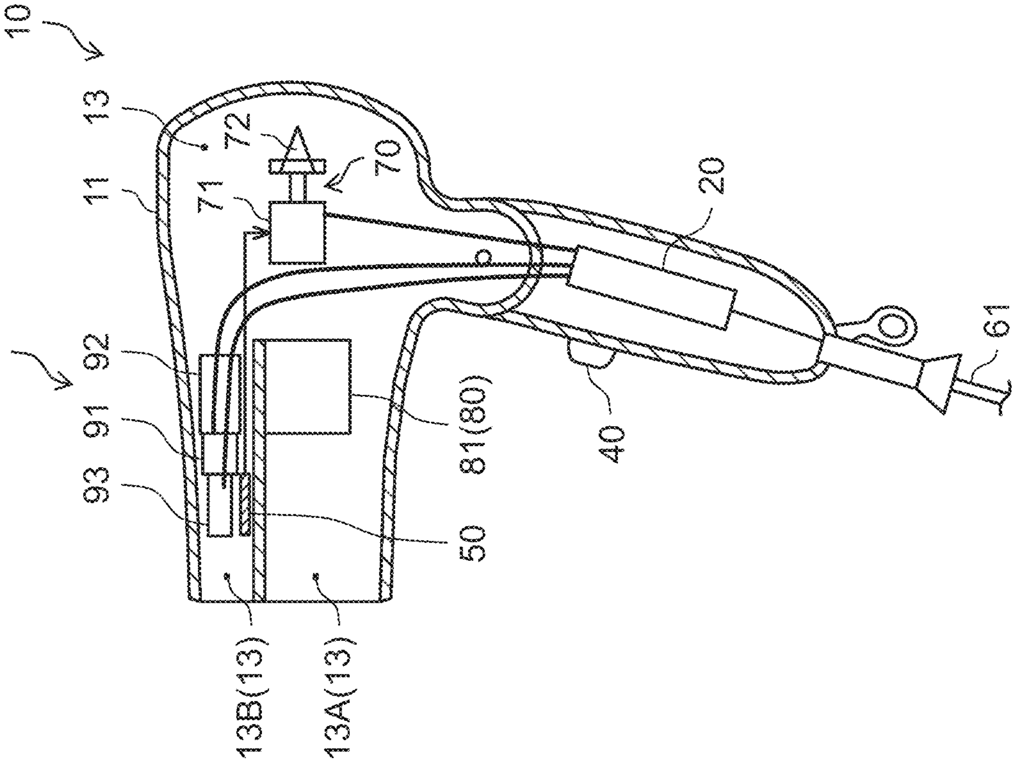
FIG. 2 is a cross-sectional view of the hair care device in FIG. 1.
Figure 1:
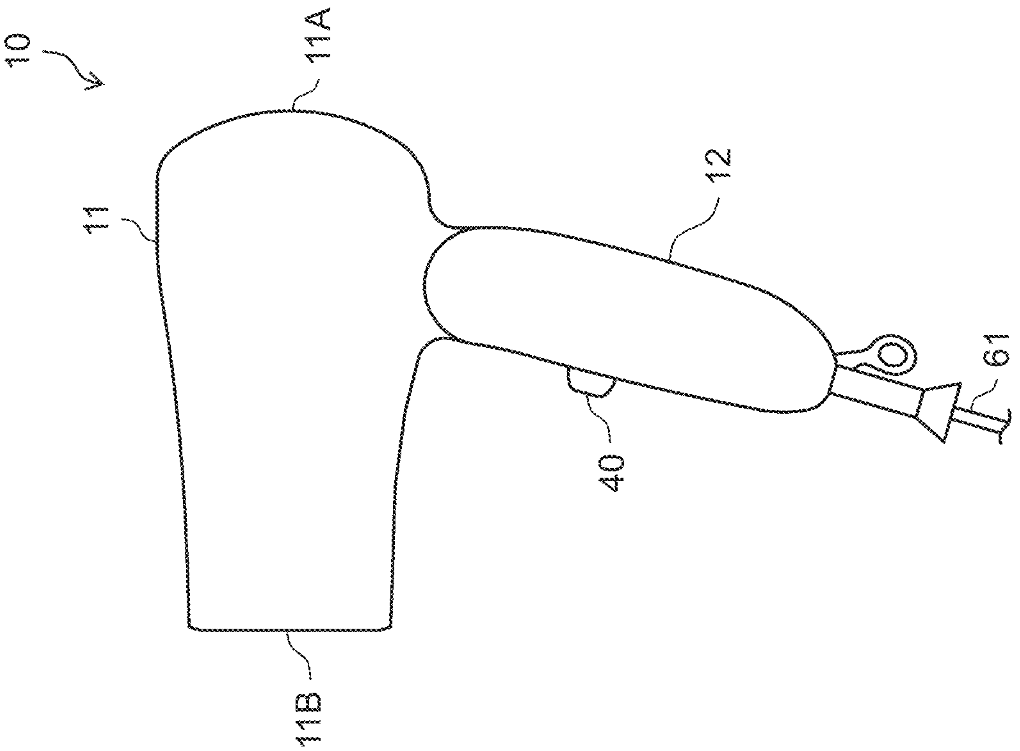
FIG. 1 is a side view of a hair care device according to an exemplary embodiment.
Figure 3:
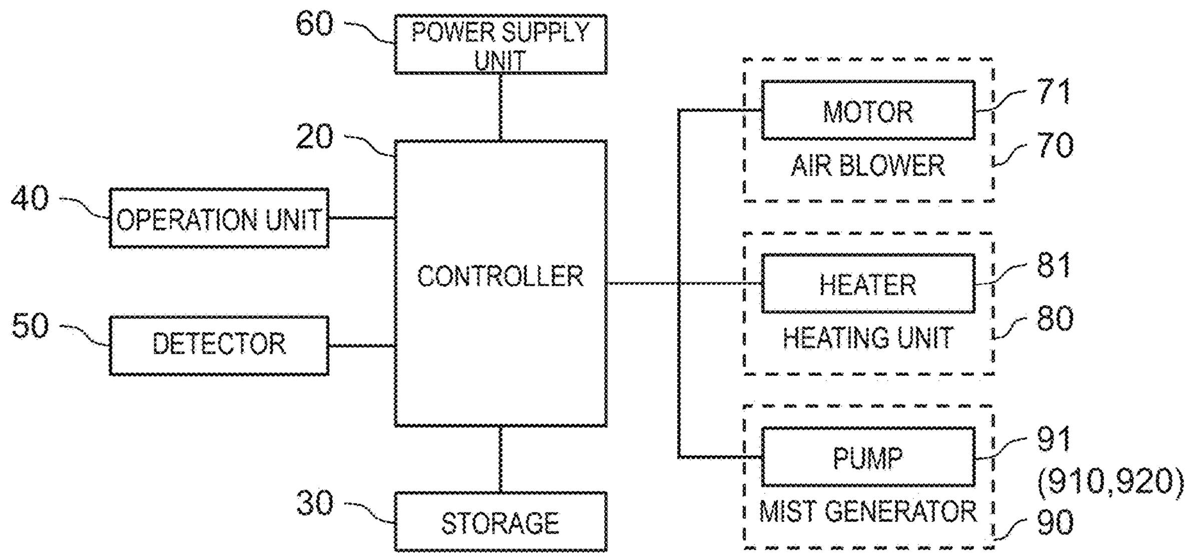
FIG. 3 is a block diagram illustrating an electrical connection of the hair care device in FIG. 1.

Hereinafter, hair care device 10 of a first exemplary embodiment is described with reference to FIGS. 1 to 3. Hair care device 10 supplies at least one of a cosmetic component and air to the hair or the like of a user. Hair care device 10 is, for example, a dryer. Hair care device 10 includes housing 11 that constitutes the appearance of hair care device 10 and houses at least one of the other elements that constitute hair care device 10, and grip 12 that is gripped by the user in use. Housing 11 and grip 12 are preferably connected to each other by a connector configured to be able to change a position of housing 11 with respect to grip 12. Housing 11 and grip 12 are made of any material having excellent heat resistance. In one example, the material constituting housing 11 and grip 12 is polycarbonate. Housing 11 includes suction port 11A through which the external air flows in and discharge port 11B through which the cosmetic component or the air is discharged to the outside. Suction port 11A preferably includes a filter that prevents dust or the like in the outside air from entering housing 11. Suction port 11A and discharge port 11B each have, for example, an elliptical shape.

Housing 11 includes flow path 13 in which a fluid flow is formed. Flow path 13 connects suction port 11A and discharge port 11B. Flow path 13 includes first flow path 13A through which mainly gas passes and second flow path 13B through which mainly cosmetic components pass. In one example, the length of each of first flow path 13A and second flow path 13B is half the length of the entire length of flow path 13.

Hair care device 10 further includes controller 20, storage 30, operation unit 40, detector 50, power supply unit 60, air blower 70, heating unit 80, and mist generator 90. At least one of controller 20, storage 30, operation unit 40, detector 50, power supply unit 60, air blower 70, heating unit 80, and mist generator 90 is held inside housing 11.

Controller 20 is constituted of an arithmetic processing unit that executes a control program. The arithmetic processing unit is constituted of, for example, at least one or both of a central processing unit (CPU) and a micro processing unit (MPU). Controller 20 is configured to be able to communicate with storage 30, operation unit 40, detector 50, air blower 70, heating unit 80, and mist generator 90 in a wireless or wired manner Controller 20 starts control when, for example, power is supplied from power supply unit 60 and an operation signal is input from operation unit 40. Preferably, controller 20 is provided at a position away from heating unit 80 as a heat generation source. In one example, controller 20 is provided at a location corresponding to grip 12.

Storage 30 stores program information and table information for executing various controls executed by controller 20. The table information is information in which a detection value detected by detector 50 is associated with appropriate amounts of output of air blower 70 and mist generator 90. Storage 30 includes, for example, a non-volatile memory and a volatile memory. Storage 30 is provided in the same control circuit as, for example, controller 20.

Operation unit 40 outputs an operation signal by, for example, an operation from the user to controller 20. The operation signal includes a signal for switching on and off of controller 20 or a signal for changing the output of at least one of air blower 70, heating unit 80, and mist generator 90 by controller 20. A part of operation unit 40 is configured to protrude toward the outside of housing 11 to allow the user to operate easily. Operation unit 40 is constituted of, for example, a button, a switch, and a dial. Operation unit 40 may be constituted of a touch panel. Operation unit 40 is mounted on, for example, grip 12.

Detector 50 detects various pieces of information on hair care device 10. The detection value detected by detector 50 is output to controller 20. In a first example, detector 50 is constituted of an acceleration sensor or a gyro sensor, and detects movement of hair care device 10 in three axial directions. Specifically, detector 50 detects acceleration or angular velocity. In the case of the first example, detector 50 is preferably disposed in second flow path 13B. In a second example, detector 50 detects torque of motors provided in air blower 70 and mist generator 90. Specifically, detector 50 is constituted of a torque sensor. Specifically, detector 50 may be configured to detect counter electromotive force. In one example, detector 50 is a microcomputer that controls a motor. Controller 20 calculates the rotation speed and the load torque of the motor from the counter electromotive force. In a third example, detector 50 detects the number of times used and a usage time period of hair care device 10. Detector 50 includes a configuration of at least one of the first example and the second example. More preferably, detector 50 includes all the configurations of detector 50 from the first to third examples.

Power supply unit 60 supplies power to controller 20, storage 30, operation unit 40, detector 50, air blower 70, heating unit 80, and mist generator 90. In the illustrated example, power supply unit 60 is an external power supply such as a commercial power supply. Power supply unit 60 may have a configuration of a secondary battery provided inside housing 11. When power supply unit 60 is the external power supply, hair care device 10 and power supply unit 60 are connected by power line 61.

Air blower 70 forms a flow that sucks the air from suction port 11A and discharges the air from discharge port 11B. Air blower 70 includes motor 71 and fan 72. When motor 71 is driven to rotate fan 72, an air flow is generated in flow path 13. Motor 71 is controlled by controller 20. Air blower 70 is located upstream of first flow path 13A and second flow path 13B in flow path 13, and supplies the air to both first flow path 13A and second flow path 13B.

Heating unit 80 heats the air in housing 11 to produce hot air. The hot air is, for example, the air within a range of 100° C. to 120° C. inclusive. Heating unit 80 includes heater 81. An example of heater 81 includes a positive temperature coefficient (PTC) heater or an infrared heater. Heating unit 80 is provided, for example, in first flow path 13A. Controller 20 controls the output of heater 81.

Mist generator 90 forms the cosmetic component in a mist form. The cosmetic component is a liquid or a component contained in a liquid. Mist generator 90 includes pump 91, tank 92, and nozzle 93. Pump 91 is a liquid pump that supplies the cosmetic component stored in tank 92 to nozzle 93 by driving a motor (not shown). The liquid pump is, for example, a gear pump. Tank 92 stores the liquid containing the cosmetic component in the inside of hair care device 10. Tank 92 is made of any material suitable for holding the liquid containing the cosmetic component. Examples include at least one of polyethylene, polypropylene, polyvinylidene chloride, nylon, polyethylene terephthalate, an ethylene vinyl alcohol copolymer, polyvinyl alcohol, and aluminum. Nozzle 93 forms the cosmetic component, which is a liquid, in a mist form. Nozzle 93 is made of resin or metal. Nozzle 93 includes a plurality of minute holes. When the cosmetic component of the liquid supplied by pump 91 passes through the minute holes, the cosmetic component is generated in a mist form. Alternatively, the cosmetic component and the gas are mixed inside nozzle 93 to generate the cosmetic component in a mist form by shearing force. In this case, pump 91 further includes a gas pump. The gas pump is, for example, a diaphragm pump.

The cosmetic component contains at least one of amino acids such as glycine, alanine, valine, leucine, isoleucine, phenylalanine, proline, hydroxyproline, threonine, serine, tyrosine, methionine, tryptophan, cystine, cysteic acid, arginine, histidine, lysine, hydroxylysine, and glutamic acid; higher fatty acids such as capric acid, lauric acid, myristic acid, palmitic acid, stearic acid, behenic acid, oleic acid, coconut oil fatty acid, isostearic acid, isopalmitic acid, and α-linolenic acid; hydrocarbon oils such as liquid paraffin, liquid isoparaffin, vaseline, squalene, and squalane; natural oils such as *camellia* oil, macadamia oil, corn oil, olive oil, avocado oil, castor oil, safflower oil, jojoba oil, sunflower oil, rapeseed oil, sesame oil, soybean oil, and meadow foam oil; organic acids such as malic acid, tannic acid, citric acid; lipids such as cholesterol, ceramide 1, ceramide 2, ceramide 3, ceramide 1A, ceramide 611, 18-methyleicosanoic acid, cholesterol sulfate, triglyceride, and lysolecithin; higher alcohols such as stearyl alcohol and cetyl alcohol; esters such as beeswax, candelilla wax, carnarba wax, isopropyl palmitate, myristyl lactate, 2-ethylhexyl stearate, wax esters, isopropyl myristate, myristyl myristate, octyl palmitate, stearyl stearate, isocetyl stearate, isononyl isononanoate, isotridecyl isononanoate, hydrogenated castor oil stearate, hydroxystearate hydrogenated castor oil, glyceryl tri(2-ethylhexanoate), pentaerythritol tetra(2-ethylhexanoate), neopentyl glycol dicaprate, diglyceryl diisostearate, dipentaerythritol, and esters with mixed fatty acids such as hydroxystearic acid/stearic acid/rosin acid; silicones such as dimethylpolysiloxane, amino-modified silicone, polyether modified, and cationized silicone; antioxidants such as polyphenols, vitamins and fullerenes; polysaccharides such as D-galactose, D-glucuronic acid, L-fucose, D-mannose, chitosan, and cationized polysaccharides; humectants such as glycerin, water, xanthan gum, panthenol, sucrose, glucose, fructose, sorbitol, mannitol, xylitol, maltitol, diglycerin, triglycerin, propylene glycol, dipropylene glycol, polypropylene glycol, triethylene glycol, tetraethylene glycol, polyethylene glycol, 1,2-butylene glycol, 1,3-butylene glycol, 1,2-pentanediol, hexylene glycol, erythritol, polyoxyethylene methyl glucoside, and polyvinyl alcohol; sphingosines such as dihydrosphingosine, phytosphingosine, and hydroxy caproyl phytosphingosine; peptides such as collagen PPT, keratin PPT, silk PPT, pearl PPT, milk PPT, soybean PPT, cationized PPT derivatives of the above PPT, acylated PPT derivatives, silylated PPT derivatives, and ethyl esterified PPT derivatives; proteins such as sesame protein, protein obtained from seeds of leguminous plants, rice protein, protein obtained from shells having pearl layers or pearls, and protein obtained from silk; extracts such as *ginseng* extract, rice germ extract, fuc ales extract, *camellia* extract, aloe extract; shell ginger extract, and *chlorella* extract; metals such as zinc, magnesium, and calcium; polymer compounds such as cationized cellulose, hydroxylated cellulose, highly polymerized polyethylene oxide, and cationized synthetic polymer; anti-dandruff agents such as zinc pyrithione and benzalkonium chloride; and antibacterial agents such as dipotassium glycyrrhizinate.

Figure 4:
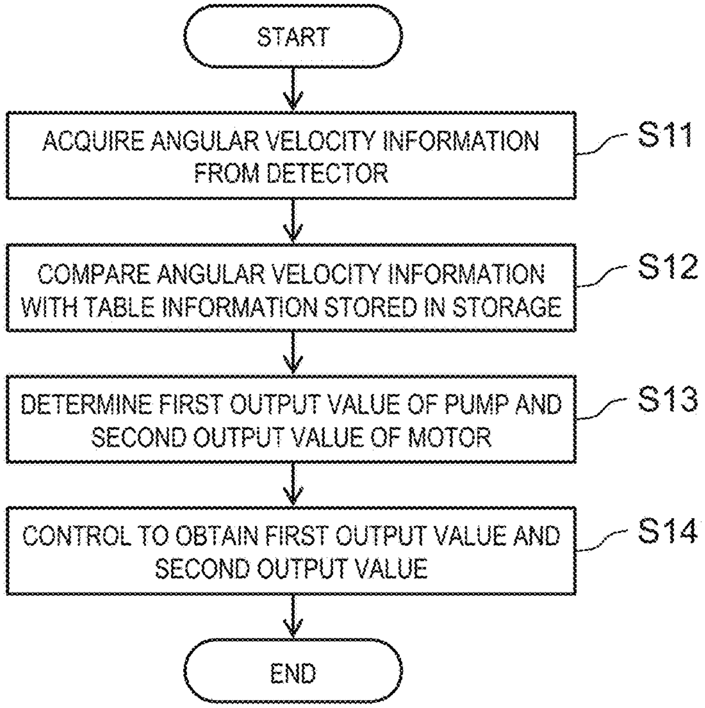
FIG. 4 is a flowchart illustrating an example of first control executed by a controller in a first exemplary embodiment.

First control executed by controller 20 is described with reference to FIG. 4.

The first control is control executed by controller 20 at predetermined intervals when the user uses hair care device 10. Detector 50 includes a configuration of detector 50 of at least the first example.

In step S11, controller 20 acquires angular velocity information including the angular velocity of hair care device 10 from detector 50. In step S12, controller 20 compares the angular velocity information with table information stored in storage 30. The table information stores outputs of air blower 70 and mist generator 90 appropriate for the angular velocity of hair care device 10 in association with experimentally obtained results. Specifically, when the angular velocity is large, controller 20 reduces the output of the motor of mist generator 90 and supply capability of pump 91, and controls an amount of mist output from second flow path 13B to be small. When the angular velocity is large, controller 20 increases the output of motor 71 of air blower 70 to increase the air volume output from first flow path 13A.

In step S13, controller 20 determines a first output value of pump 91 of mist generator 90 and a second output value of motor 71 of air blower 70 from the table information. In step S14, controller 20 controls to make the output of pump 91 of mist generator 90 become the first output value and the output of motor 71 of air blower 70 become the second output value. After completion of step S14, controller 20 ends the control.

An operation of hair care device 10 of the first exemplary embodiment is described.

When the user operates operation unit 40, power is supplied to hair care device 10. The user performs hair care by directing discharge port 11B of hair care device 10 toward the hair. Controller 20 controls the output of pump 91 of mist generator 90 and the output of motor 71 of air blower 70 in accordance with the operation of hair care device 10 by the user.

Second Exemplary Embodiment

Hair care device 10 of a second exemplary embodiment is different from hair care device 10 of the first exemplary embodiment in that detector 50 includes the configuration of the second example, and controller 20 performs control based on a detection value of detector 50 of the second example. A part or all of the description of the configuration similar to that of hair care device 10 of the first exemplary embodiment may be omitted.

Controller 20 executes control based on a value of a torque sensor configured as detector 50. The torque sensor detects torque of a motor provided in hair care device 10. In one example, detector 50 detects the torque of a motor constituting pump 91 of mist generator 90. Pump 91 includes liquid feed pump 910 that supplies the cosmetic component from tank 92 to nozzle 93 and air blower pump 920 that supplies gas to nozzle 93. Liquid feed pump 910 is, for example, a gear pump. Air blower pump 920 is, for example, a diaphragm pump.

Figure 5:
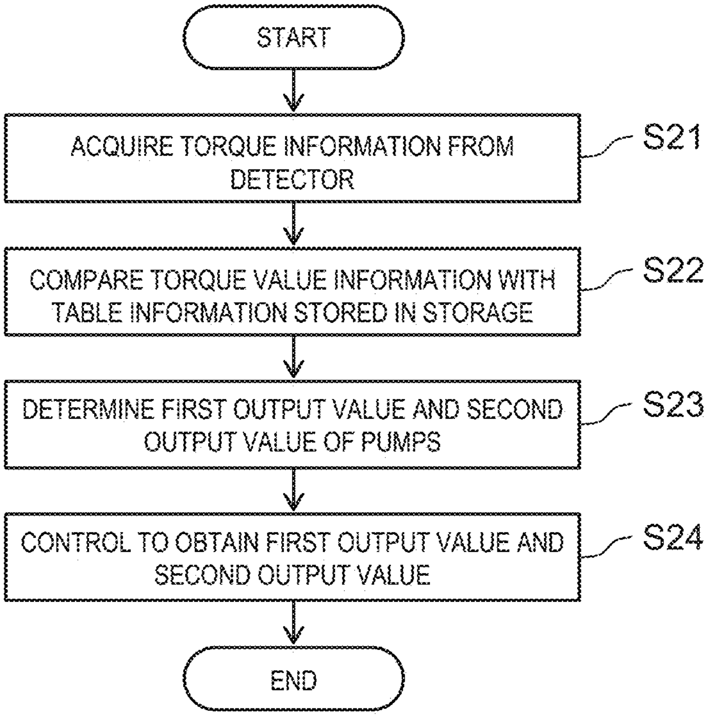
FIG. 5 is a flowchart illustrating an example of second control executed by a controller in a second exemplary embodiment.

Second control executed by controller 20 is described with reference to FIG. 5.

The second control is control for determining a first output value of liquid feed pump 910 and a second output value of air blower pump 920 constituting pump 91 of mist generator 90 during a predetermined period from the start of use of hair care device 10. Controller 20 executes the process of step S21 when pump 91 operates.

In step S21, controller 20 acquires torque value information from detector 50. Specifically, the torque value information of the motor of liquid feed pump 910 is detected. In the case where the torque value information is acquired over time and the torque exceeds the first maximum value, controller 20 proceeds to the process of step S22.

In step S22, controller 20 compares the torque value information with table information stored in storage 30. The table information is information in which the torque value information experimentally obtained in advance is associated with the type of the cosmetic component. Specifically, the higher the viscosity of the cosmetic component, the higher the torque value, and the lower the viscosity of the cosmetic component, the lower the torque value. Controller 20 estimates the cosmetic component stored in tank 92 of hair care device 10 from the table information, and determines the type of the cosmetic component.

In step S23, controller 20 determines the first output value and the second output value of pump 91 based on the determined type of the cosmetic component. Specifically, controller 20 determines the first output value that is the torque of the motor of liquid feed pump 910 and the second output value that is the torque of the motor of air blower pump 920. In step S24, controller 20 controls to make the outputs of the motor of pump 91 of mist generator 90 become the first output value and the second output value. After completion of step S24, controller 20 ends the control.

An operation of hair care device 10 of the second exemplary embodiment is described When the user operates operation unit 40, power is supplied to hair care device 10. The user performs hair care by directing discharge port 11B of hair care device 10 toward the hair. Controller 20 determines the type of the cosmetic component, and controls the output of pump 91 of mist generator 90 according to the type of the cosmetic component used by the user.

As described above, in the hair care device of the present exemplary embodiment, the detector may detect the maximum value of torque of the liquid feed pump, and the controller may adjust the output of the liquid feed pump based on the maximum value of torque of the liquid feed pump.

In addition, the controller may specify the type of liquid stored in the tank from the maximum value of torque of the liquid feed pump and adjust the output of the liquid feed pump based on the type of liquid.

According to the hair care device of the present exemplary embodiment, the hair care device includes the air blower pump that outputs gas, and the controller may adjust the output of the air blower pump based on the detection value of the detector.

In addition, the detector may detect the maximum value of torque of the air blower pump, and the controller may adjust the output of the air blower pump based on the maximum value of torque of the air blower pump.

Third Exemplary Embodiment

Hair care device 10 according to a third exemplary embodiment is different from hair care device 10 according to the second exemplary embodiment in that table information stored in storage 30 does not include types of cosmetic components. A part or all of the description of the configuration similar to that of hair care device 10 of the first exemplary embodiment and the second exemplary embodiment may be omitted.

Controller 20 detects torque of a motor of liquid feed pump 910 and torque of a motor of air blower pump 920 from detector 50 of the second example, and executes third control for determining a first output value and a second output value of pump 91 based on the detected torque value information.

The third control is described. Controller 20 acquires the torque and the rotation speed of the motor of liquid feed pump 910 from detector 50 simultaneously with the start of liquid feed pump 910. Controller 20 increases the output of liquid feed pump 910 until the rotation speed of liquid feeding pump 910 reaches a predetermined rotation speed. An optional rotation speed is set as the predetermined rotation speed. For example, the rotation speed is set to the rotation speed in the case of supplying pure water to nozzle 93 by liquid feed pump 910.

Controller 20 starts the motor of air blower pump 920 and estimates the load torque of the motor of air blower pump 920. The load torque is estimated based on the counter electromotive force detected by detector 50. Controller 20 sets an input voltage of the motor of air blower pump 920 in which a fluctuation range of the load torque is less than or equal to a certain value. When the size of the mist of the cosmetic component is not appropriate, the fluctuation range of the load torque increases. Because the rotation speed of the motor of liquid feed pump 910 increases by the output of air blower pump 920, controller 20 decreases the output of liquid feed pump 910 until the rotation speed of the motor of liquid feed pump 910 reaches a predetermined rotation speed. Controller 20 respectively drives the motor of liquid feed pump 910 and the motor of air blower pump 920 at suitable rotation speeds. Controller 20 repeatedly executes the third control while hair care device 10 is in operation.

According to hair care device 10 of the third exemplary embodiment, the following effect can be obtained.

Controller 20 can execute appropriate output based on the detection values of the motors of liquid feed pump 910 and air blower pump 920. Therefore, even when the type of cosmetic component cannot be identified, the output of pump 91 can be suitably controlled.

(Modifications)

The descriptions relating to the exemplary embodiments are merely examples of modes that the hair care device of the present invention can take, and do not intend to limit such modes. The present invention can include, in addition to the exemplary embodiments, for example, following modifications of the exemplary embodiments, and any configurations acquired by combining at least two modifications which do not contradict with each other.

Hair care device 10 according to the first to third exemplary embodiments may further include a configuration of a notification unit that notifies of various kinds of information. The notification unit notifies of, for example, information detected by detector 50. The notification unit is constituted of, for example, a display.

In hair care device 10 according to the second exemplary embodiment, controller 20 may further control heater 81. In one example, controller 20 changes the output of heater 81 according to the type of the cosmetic component. The table information further includes information for associating the type of cosmetic component with an appropriate blowing temperature.

A hair care device according to the present disclosure can be used for commercial and home hair care devices that are used for hair care.

REFERENCE MARKS IN THE DRAWINGS

10 hair care device
20 controller
50 detector
70 air blower
71 motor
72 fan
90 mist generator
91 pump
910 liquid feed pump
920 air blower pump
92 tank

The invention claimed is:

1. A hair care device comprising:

a tank that stores a liquid;

a liquid feed pump that outputs the liquid stored in the tank;

a controller that controls an output of the liquid feed pump;

an air blower pump that supplies a gas; and a detector that detects torque of the liquid feed pump, wherein the controller adjusts the output of the liquid feed pump and an output of the air blower pump based on a detection value of the detector.

2. The hair care device according to claim 1, wherein
the detector detects a maximum value of the torque of the liquid feed pump, and
the controller adjusts the output of the liquid feed pump based on the maximum value of the torque.

3. The hair care device according to claim 2, wherein the controller identifies a type of the liquid from the maximum value of the torque and adjusts the output of the liquid feed pump based on the type of the liquid.

4. The hair care device according to claim 1, wherein
the detector detects a maximum value of the torque, and
the controller adjusts the output of the air blower pump based on the maximum value of the torque.

5. The hair care device according to claim 1, further comprising a mist generator including a nozzle,
wherein the air blower pump supplies the gas to the nozzle.

* * * * *